United States Patent
Jevans

(10) Patent No.: US 8,924,719 B2
(45) Date of Patent: *Dec. 30, 2014

(54) MECHANISM FOR EFFICIENT PRIVATE BULK MESSAGING

(71) Applicant: Axway Inc., Phoenix, AZ (US)

(72) Inventor: David Jevans, Los Altos, CA (US)

(73) Assignee: Axway Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/717,297

(22) Filed: Dec. 17, 2012

(65) Prior Publication Data

US 2013/0283039 A1    Oct. 24, 2013

Related U.S. Application Data

(63) Continuation of application No. 11/107,679, filed on Apr. 15, 2005, now Pat. No. 8,335,919, which is a continuation of application No. 09/792,949, filed on Feb. 26, 2001, now Pat. No. 6,912,285.

(60) Provisional application No. 60/184,785, filed on Feb. 24, 2000.

(51) Int. Cl.
*H04L 29/06* (2006.01)
*H04L 9/08* (2006.01)

(52) U.S. Cl.
CPC .......... *H04L 63/0471* (2013.01); *H04L 63/062* (2013.01); *H04L 9/0825* (2013.01); *H04L 9/083* (2013.01); *H04L 63/12* (2013.01); *H04L 63/0428* (2013.01); *H04L 63/0442* (2013.01); *H04L 63/0435* (2013.01)

USPC ............ 713/162; 713/163; 380/45; 380/283; 380/284

(58) Field of Classification Search
None
See application file for complete search history.

(56) References Cited

U.S. PATENT DOCUMENTS

| | | | | |
|---|---|---|---|---|
| 5,673,316 B2 * | 9/1997 | Auerbach et al. | ............... | 705/51 |
| 5,719,938 B2 * | 2/1998 | Haas et al. | ...................... | 705/52 |
| 6,092,201 A * | 7/2000 | Turnbull et al. | .................. | 726/4 |
| 6,912,285 B2 * | 6/2005 | Jevans | .......................... | 380/284 |
| 8,335,919 B2 * | 12/2012 | Jevans | .......................... | 713/162 |

* cited by examiner

*Primary Examiner* — Kaveh Abrishamkar

(74) *Attorney, Agent, or Firm* — Haynes and Boone, LLP

(57) ABSTRACT

Secure bulk messaging mechanism in which, roughly described, a sender first encrypts a message once. The message can be decrypted with a message decryption key. These can be symmetric or asymmetric keys. For each recipient, the sender then encrypts the message decryption key with the recipient's public key. The sender then sends the encrypted message and the encrypted message decryption keys to a store-and-forward server. Subsequently, one or more recipients connect to the server and retrieve the encrypted message and the message encryption key that has been encrypted with the recipient's public key. Alternatively, the server can forward these items to each individual recipient. The recipient then decrypts the encrypted message decryption key with the recipient's private key, resulting in an unencrypted message decryption key. The recipient then decrypts the message using the unencrypted message decryption key.

19 Claims, 3 Drawing Sheets

MECHANISM FOR EFFICIENT PRIVATE BULK MESSAGING

CROSS-REFERENCE TO RELATED APPLICATION

This application is a continuation of U.S. patent application Ser. No. 11/107,679, filed Apr. 15, 2005, which is in turn a continuation of U.S. patent application Ser. No. 09/792,949, entitled "Mechanism for Efficient Private Bulk Messaging" filed Feb. 26, 2001, now U.S. Pat. No. 6,912,285, which in turn claims priority of U.S. Provisional Patent Application No. 60/184,785, filed Feb. 24, 2000. Each of the foregoing applications is incorporated herein by reference.

BACKGROUND

1. Field of the Invention

The invention relates to secure transmission of documents, and more particularly, to transmission of documents to a large number of recipients, securely and efficiently.

2. Description of Related Art

The Internet and corporate networks have made the transmission of documents and messages via e-mail commonplace. Bulk messaging has also become commonplace, such as for advertising and promotional purposes. For bulk messaging, typically a user on one computer composes a message and addresses it to an e-mail group. The message is transmitted to a server, which substitutes the individual addresses of all the target recipients in the group, which may number in the thousands, and transmits the message individually to each target recipient.

Unlike advertising and promotional uses, many businesses require that their communications take place securely. When messages are to be transmitted across an insecure network, such as the Internet, security is typically accomplished by encrypting the message in a manner that can be decrypted only with knowledge of a decryption key. Since only the intended recipient is expected to have the decryption key, only that recipient will be able to open the message and view its contents. Encryption may be performed using a symmetrical encryption algorithm, in which the encryption key matches the decryption key, or by an asymmetric algorithm, in which the encryption key is different from the decryption key. One popular form of asymmetric encryption is public/private key encryption, described in "Public-key Cryptography Standards," RSA Data Security, Inc. (1991), and in Rivest U.S. Pat. No. 4,405,829, both incorporated by reference herein.

According to the public/private key crypto system, each target recipient has both a private key that only the recipient knows, and a public key that is publicly available. When a sender desires to send a message securely to one of the target recipients, the sender encrypts the message using the target recipient's public key. Only the target recipient then is able to open the message and view its contents.

Secure messaging becomes problematical when the sender desires to send the message to a large number of target recipients. If a public/private key cryptosystem is to be used, then the sender must encrypt the message N times, once using the public key of each of the N target recipients, and then send the message separately to each of the target recipients. If the document to be transmitted is large, and/or if N is in the thousands, this can be a formidable task. The encryption part of the task can be minimized if all of the target recipients share a single decryption key, because then the sender need encrypt the message only once. But the need for all recipients to have the decryption key poses risks both in the transmission and in the storage of the key. This solution also does not overcome the need for the sender to transmit the message separately, once to each of the N target recipients.

Accordingly, there is a need for a more efficient mechanism for secure bulk transmission of messages.

SUMMARY OF THE INVENTION

According to the invention, roughly described, a sender first encrypts the message once. The message can be decrypted with a message decryption key. These can be symmetric or asymmetric keys. For each recipient, the sender then encrypts the message decryption key with the recipient's public key. The sender then sends the encrypted message and the encrypted message decryption keys to a store-and-forward server. Subsequently, one or more recipients connect to the server and retrieve the encrypted message and the message encryption key that has been encrypted with the recipient's public key. Alternatively, the server can forward these items to each individual recipient. The recipient then decrypts the encrypted message decryption key with the recipient's private key, resulting in an unencrypted message decryption key. The recipient then decrypts the message using the unencrypted message decryption key.

BRIEF DESCRIPTION OF THE DRAWINGS

The invention will be described with respect to particular embodiments thereof, and reference will be made to the drawings, in which.

DETAILED DESCRIPTION

Figure 1:
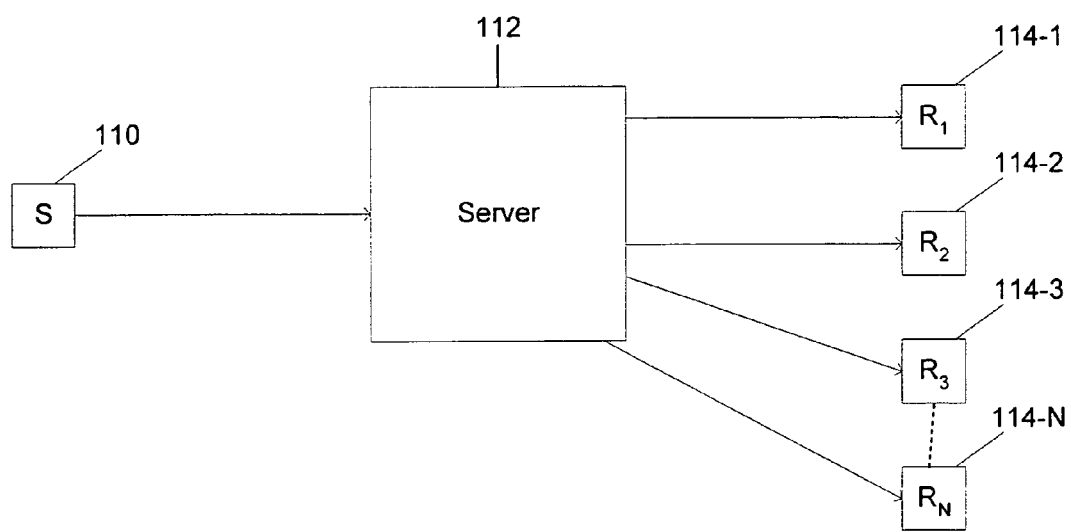
FIG. 1 is a block diagram of a system incorporating the invention.

FIG. 1 is a block diagram of a system incorporating the invention. It comprises a sender 110, which sends the encrypted message and encrypted message decryption keys to a server 112, which can then be accessed by each of N target recipients 114-1, 114-2, 114-3, ... 114-N (collectively, target recipients 114). One or more of the transmission paths from the sender 110 to the server 112 or from the server 112 to the recipients 114 are potentially insecure. As used herein, the term "message" is intended to be read broadly to include all kinds of information that might be transmitted, such as e-mail messages, documents, financial transactions, and so on. Also as used herein, the server 112 need not be limited to a single computer. It can include multiple computers which need not even be located physically together.

Figure 2:
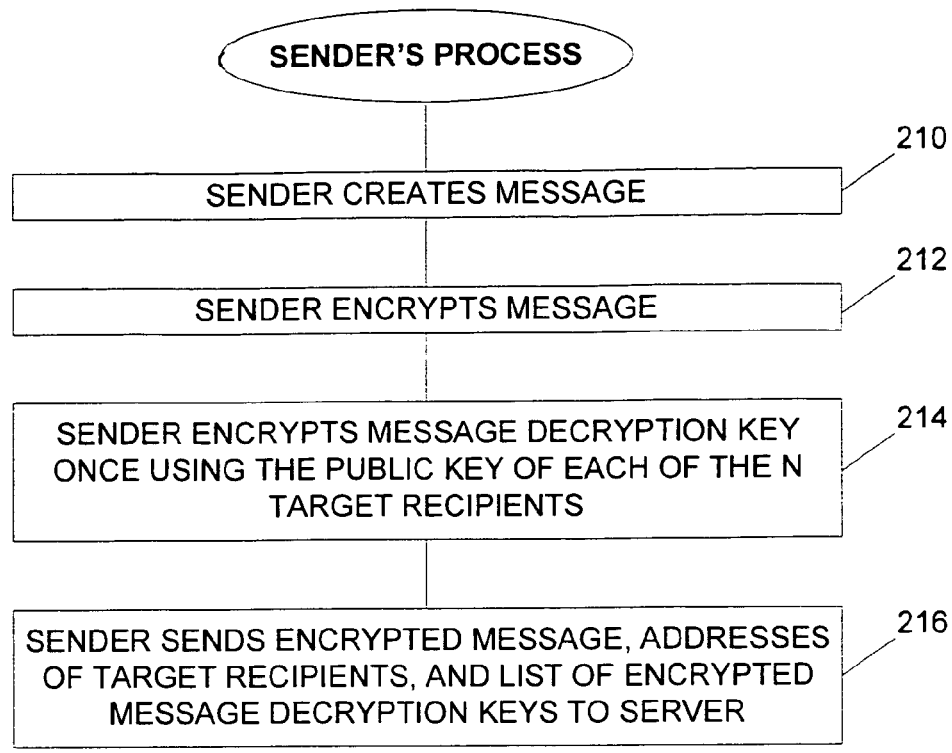
FIG. 2 is a flowchart of basic steps undertaken by a sender in transmitting a secure bulk message using the arrangement of FIG. 1.

FIG. 2 is a flowchart of the basic steps undertaken by the sender in transmitting a secure bulk message using the arrangement of FIG. 1. In step 210, the sender first creates the message to be sent. In step 212, the sender encrypts the message. As mentioned, encryption at this stage can be either by a symmetric or an asymmetric encryption algorithm. Although there are many examples of acceptable encryption algorithms, one common symmetric algorithm is that described in National Institutes of Standards and Technology, "Data Encryption Standard", FIPS Publication No. 46-1 (January 1988) (hereinafter "DES"), incorporated by reference herein. The encryption process in step 212 can be reversed using a message decryption key known by the sender.

In step 214, the sender encrypts the message decryption key N times—once using the public key of each of the N target recipients. This yields N encrypted message decryption keys. In step 216, the sender sends the encrypted message, the addresses of the target recipients, and the list of encrypted message decryption keys to the server 112. It will be appreciated that one of the target recipients could be a third-party monitor, such as a government agency that is permitted to view the message if required by law.

Optionally, the sender can also send to the server 112 (or the server itself generate) a digital signature protecting all of the encrypted decryption keys associated with a particular encrypted message. The list of encrypted decryption keys thereafter cannot be tampered with without being detectable by reference to the digital signature. A digital signature is created by digesting the list, or significant portions of the list, using a well-known digesting algorithm, and then encrypting the digest with the sender's (or server's) private key of a public/private pair. In order to check for tampering, an auditor repeats the digesting of the list of encrypted decryption keys, to form a new digest, and then decrypts the digital signature using the sender's (or the server's) public key, to recover the original digest, and then compares the two for equality. A satisfactory digesting algorithm is that describe in R. Rivest, "MD5 Message-Digest Algorithm", Internet Engineering Task Force RFC No. 1321 (April 1992), incorporated by reference herein.

Figure 4:
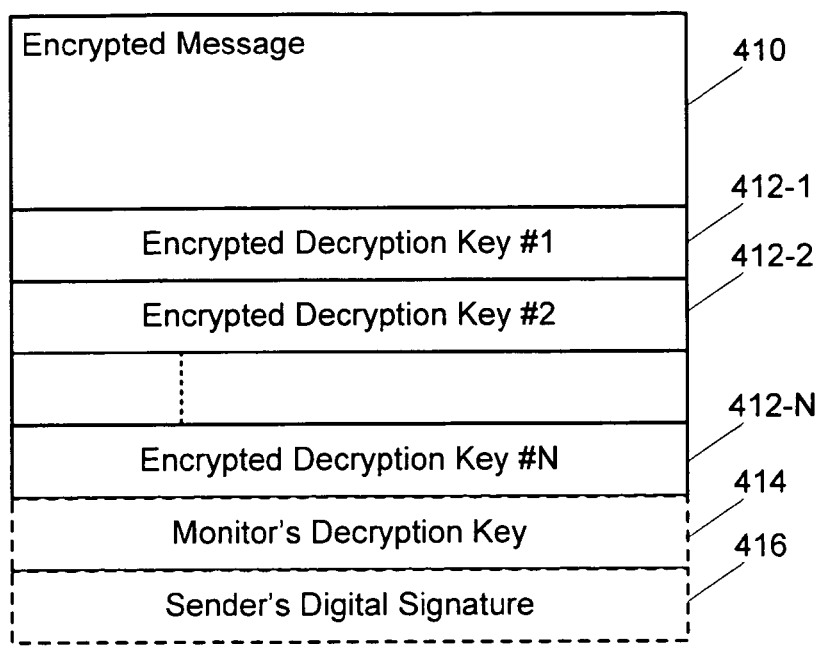
FIG. 4 illustrates a format by which an encrypted message and the encrypted decryption keys are stored on the server of FIG. 1.

On the server 112, the encrypted message and the encrypted decryption keys are stored as illustrated in FIG. 4. The encrypted message is stored at 410. In conjunction with the encrypted message 410, the server stores each of the encrypted decryption keys 412-1, 412-2, . . . , 412-N. One of the encrypted decryption keys can, as mentioned above, optionally be a monitor's decryption key 414. Optionally also stored in conjunction with the encrypted message 410, is a digital signature 416 protecting the list of encrypted decryption keys. The elements illustrated in FIG. 4 may be stored all in one contiguous region of computer-readable memory, or across discontiguous regions, or across discontiguous regions of multiple computer-readable media.

In one embodiment, the server maintains a document management system which not only stores multiple encrypted messages and their associated encrypted decryption keys, but also provides logical and structured restricted access to the various items by individual senders and individual recipients. For example, one such document management system allows senders to change the message stored on the server 112, while not allowing other senders to do so and while not allowing any recipient to do so. Another such document management system allows senders to add, delete or change entries in the list of encrypted decryption keys for messages that were transmitted by the sender, while not allowing such modifications by other senders or by any recipient. Yet another such document management system, when accessed by a particular recipient, shows the recipient only those messages on which the particular recipient is identified as a target recipient, hiding any messages for which there is no encrypted decryption key for the particular recipient.

Figure 3:
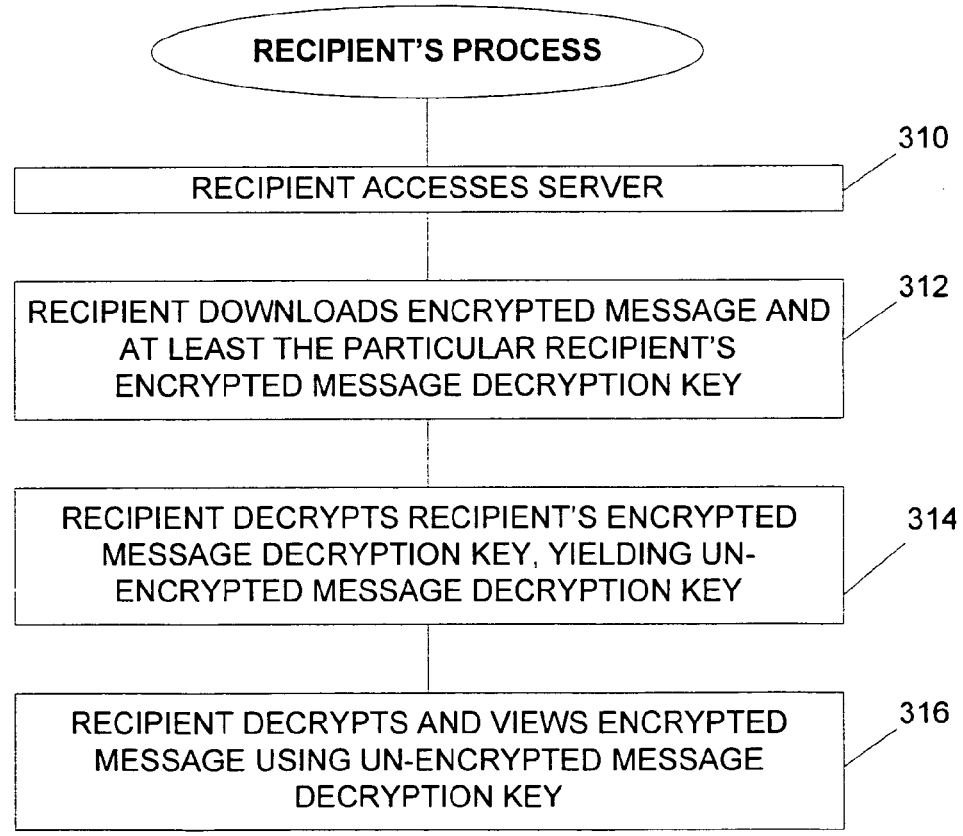
FIG. 3 is a flowchart illustrating the process undertaken by a recipient to retrieve and open the message.

FIG. 3 is a flowchart illustrating the process undertaken by a recipient to retrieve and open the message. In step 310, the recipient accesses the server 112, and in step 312, the recipient downloads the encrypted message and at least the particular recipient's encrypted message decryption key 412. Alternatively, the server 112 can forward these items to the recipient without awaiting action from the recipient. In step 314, the particular recipient decrypts the recipient's encrypted message decryption key, yielding an unencrypted message decryption key. In step 316, the recipient decrypts and views the encrypted message using the now-unencrypted message decryption key.

It will be appreciated that the above-described mechanism is capable of many variations. As one example, in step 216, the sending of the encrypted message and list of encrypted message decryption keys need not take place in a single transmission. Some of all of the encrypted message decryption keys can be sent earlier or later than the encrypted message.

As another example, encrypted decryption keys could be bundled into the message and the single message with the encrypted decryption keys could be broadcast to all recipients without compromising the security of the mechanism.

As yet another example, public and private keys for encrypting the decryption keys could be replaced with symmetric private keys without affecting the security or efficiency of the mechanism.

As still another example, server 112 could be eliminated and the message with the encrypted decryption keys could be broadcast to all recipients and any other listeners, and only the target recipients will be able to decrypt the message and the security of the mechanism is not compromised.

As yet another example, for one or more of the target recipients, the sender can multiply encrypt the recipient's message decryption key, thereby requiring multiple entities to be involved in the decryption of the message decryption key. For example, the sender may first encrypt the message decryption key with the target recipient's public key, yielding a "partially-encrypted" message decryption key. The sender may then re-encrypt the partially-encrypted message decryption key, using the public key of an authorizer, thus yielding the final encrypted message decryption key. Upon receipt of the message, the recipient first has the encrypted decryption key decrypted by the authorizer, using the authorizer's private key. This recovers the partially-encrypted message decryption key. The recipient then decrypts the partially-encrypted message decryption key, using the recipient's private key, thus yielding the un-encrypted message decryption key. Alternatively, the order of encryption for the multiple parties can be reversed, as long as the decryption sequence takes place in the same order as the encryption sequence.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section of this patent application are specifically incorporated by reference into the description herein of embodiments of the invention. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A document management system comprising:
   a sender;
   plural target recipients; and
   a server coupled between the sender and the target recipients to receive from the sender and to provide to at least some of the target recipients a message, wherein the provided message is encrypted at least for storage at the server using a sender key and is decryptable using a corresponding message decryption key that is, in turn, separately encrypted for each of the target recipients using respective encryption keys associated with the target recipients themselves, thereby resulting in a plurality of recipient-associated encrypted decryption keys;
   the server providing each of the target recipients with at least a respective one of the recipient-associated encrypted decryption keys for decryption by the respective target recipient to recover the underlying message decryption key and to thereby provide the respective target recipient with access to the encrypted message, and
   wherein the sender system sends the recipient-associated encrypted decryption keys to the server for inclusion in a list of authorized encrypted decryption keys, and wherein, responsive to the sender, at least one but less than all of the recipient-associated encrypted decryption keys on the list is changed, but not the encrypted message itself which remains unchanged.

2. The document management system of claim 1,
   wherein the respective encryption keys associated with the target recipients are public keys of the respective target recipients established in accord with an asymmetric cryptosystem.

3. The document management system of claim 1,
   wherein the sender key is a private key of the sender established in accord with an asymmetric cryptosystem.

4. The document management system of claim 3,
   wherein the message decryption key is a second key corresponding to the private key and established in accord with the asymmetric cryptosystem.

5. The document management system of claim 1,
   wherein the sender key and the message decryption key are part of a symmetric cryptosystem.

6. The document management system of claim 1, further comprising:
   a sender system, whereby the sender encrypts the message, using the sender key, to supply the encrypted message and further encrypts, using respective encryption keys associated with the target recipients, the message decryption key to supply the plurality of recipient-associated encrypted decryption keys.

7. The document management system of claim 1,
   wherein the changing thereby impedes access to the message by at least one target recipient for which the at least one recipient-associated encrypted decryption key was changed, but preserves access, by way of unchanged ones of the recipient-associated encrypted decryption keys, to the unchanged encrypted message.

8. The document management system of claim 7,
   wherein the changing of one of said recipient-associated encrypted decryption keys follows provision of the encrypted message to a target recipient.

9. The document management system of claim 7,
   wherein the changing includes deleting a recipient-associated encrypted decryption key from the list.

10. The document management system of claim 1,
    wherein one of the target recipients is a monitor.

11. The document management system of claim 1,
    wherein at least the recipient-associated encrypted decryption keys are protected using a digital signature or message digest.

12. The document management system of claim 1,
    wherein the server provides store-and-forward transfer of either or both of the encrypted message and the recipient-associated encrypted decryption keys.

13. The document management system of claim 1, further comprising:
    a recipient system, whereby a particular one of the target recipients retrieves from the server the encrypted message and at least a particular one of the plurality of recipient-associated encrypted decryption keys.

14. The document management system of claim 13,
    wherein the recipient system is configured to decrypt the retrieved particular one of said plurality of recipient-associated encrypted decryption keys to recover the underlying message decryption key.

15. The document management system of claim 13,
    wherein the recipient system is configured to decrypt the encrypted message using the recovered message decryption key.

16. The document management system of claim 1,
    wherein the server includes storage for the plurality of recipient-associated encrypted decryption keys and the encrypted message, together with storage for other messages, wherein the server permits access only to those messages stored thereon for which an accessing user is a target recipient as indicated by inclusion of a corresponding one of the recipient-associated encrypted decryption keys in the stored plurality of recipient-associated encrypted decryption keys.

17. The document management system of claim 1,
    wherein the sender sends addresses of the target recipients to the server, and the server sends a respective one of the recipient-associated encrypted decryption keys to the addresses of the target recipients.

18. A document management system comprising:
    a sender;
    plural target recipients;
    a server coupled between the sender and the target recipients to receive from the sender and to provide to at least some of the target recipients a message, wherein the provided message is encrypted at least for storage at the server using a sender key and is decryptable using a corresponding message decryption key that is, in turn, separately encrypted for each of the target recipients using respective encryption keys associated with the target recipients themselves, thereby resulting in a plurality of recipient-associated encrypted decryption keys;
    the server providing each of the target recipients with at least a respective one of the recipient-associated encrypted decryption keys for decryption by the respective target recipient to recover the underlying message decryption key and to thereby provide the respective target recipient with access to the encrypted message; and
    a recipient system, whereby a particular one of the target recipients retrieves from the server the encrypted message and at least a particular one of the plurality of recipient-associated encrypted decryption keys,
    wherein the sender changes at least one of the plurality of recipient-associated encrypted decryption keys, and wherein the recipient system decrypts the retrieved particular one of the plurality of recipient-associated encrypted decryption keys to recover the underlying message decryption key and, using the recovered message decryption key, decrypts the received encrypted message, wherein said received encrypted message remains unchanged even after the change of at least one other one of the recipient- associated encrypted decryption keys.

19. The document management system of claim 18, wherein the decrypting of the particular recipient-associated encrypted decryption key includes decrypting with a key of a first party to develop a partially decrypted decryption key, and decrypting the partially decrypted decryption key with a key of a second party.

\* \* \* \* \*